US009519692B2

(12) United States Patent
Chow et al.

(10) Patent No.: US 9,519,692 B2
(45) Date of Patent: Dec. 13, 2016

(54) VISUALIZING RELATED EVENTS WITHIN A TIMELINE

(75) Inventors: Chadwick Chow, Woburn, MA (US); Elisabeth Rinderknecht Stein, La Jolla, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 1200 days.

(21) Appl. No.: 13/248,273

(22) Filed: Sep. 29, 2011

(65) Prior Publication Data

US 2013/0086501 A1    Apr. 4, 2013

(51) Int. Cl.
*G06F 3/048*    (2013.01)
*G06F 17/30*   (2006.01)

(52) U.S. Cl.
CPC ............... *G06F 17/30551* (2013.01)

(58) Field of Classification Search
CPC ................. G06F 3/0481; G06F 3/04817
See application file for complete search history.

(56) References Cited

U.S. PATENT DOCUMENTS

| 5,977,971 | A * | 11/1999 | Guzak | G06F 9/4443 715/853 |
| 7,853,465 | B2 | 12/2010 | Molesky | |
| 7,944,445 | B1 * | 5/2011 | Schorr | G06T 11/206 345/440 |
| 8,553,039 | B1 * | 10/2013 | Boice | G06T 11/206 345/418 |
| 2005/0223061 | A1 * | 10/2005 | Auerbach | G06Q 10/107 709/206 |
| 2006/0090141 | A1 * | 4/2006 | Loui | G06F 17/30064 715/764 |
| 2006/0271864 | A1 * | 11/2006 | Satterfield | G06F 3/0481 715/764 |
| 2008/0081594 | A1 * | 4/2008 | Lee | H04M 1/72566 455/412.2 |
| 2008/0189657 | A1 * | 8/2008 | Kim | G06F 3/0485 715/810 |
| 2008/0294663 | A1 * | 11/2008 | Heinley | G06F 3/0481 |
| 2011/0032260 | A1 | 2/2011 | Duggan et al. | |
| 2011/0113348 | A1 * | 5/2011 | Twiss | G06Q 10/10 715/753 |
| 2011/0202866 | A1 * | 8/2011 | Huang | G06F 3/0482 715/779 |

* cited by examiner

*Primary Examiner* — Stephen Hong
*Assistant Examiner* — Shahid Khan
(74) *Attorney, Agent, or Firm* — Miles & Stockbridge P.C.

(57) ABSTRACT

A timeline visualization system displays one or more groups of related events over a specified period of time within a timeline, where each group of related events is represented within the timeline as an event group. When a user interacts with the timeline, the event group expands and displays all the related events within the event group in a layer on top of the timeline. When a user interacts with the timeline a second time, the event group collapses, and the timeline (including the one or more event groups), is once again displayed.

20 Claims, 10 Drawing Sheets

VISUALIZING RELATED EVENTS WITHIN A TIMELINE

FIELD

One embodiment is directed to a computer system, and more particularly, to a computer system that displays data.

BACKGROUND

In general, a computer system can display information within a display, so that a user can view the information. However, in situations where the computer system displays a significant large amount of information, the display can appear cluttered, due to a finite size of the display. While increasing a size of the display can sometimes mitigate the problem, the amount of information can eventually reach a size where the display of information can appear cluttered, even with a larger display. Furthermore, there can be situations where it is not feasible to increase the size of the display, such as when the information is displayed on a display of a device that is purposefully designed to be a small size, such as a handheld device.

SUMMARY

One embodiment is directed to a computer-readable medium having instructions stored thereon that, when executed by a processor, cause the processor to display a timeline. The instructions include receiving data that represents a plurality of events within a timeline. The instructions further include creating an event group that comprises at least two events of the plurality of events, where the at least two events are related events based on a criteria. The instructions further include displaying the event group within the timeline. The instructions further include displaying an expanded view of the event group over the timeline in response to a first user interaction, where the expanded view comprises the at least two events of the event group. The instructions further include removing the display of the expanded view in response to a second user interaction.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

According to an embodiment, a timeline visualization system displays one or more groups of related events over a specified period of time within a timeline, where each group of related events is represented within the timeline as an event group. When a user interacts with the timeline (for example by clicking on an event group displayed within the timeline using a cursor control device, such as a computer mouse), the event group expands, and the timeline visualization system displays all the related events within the event group in a layer on top of the timeline. When a user interacts with the timeline a second time (for example, by clicking outside an expanded view of the related events within the event group using the cursor control device), the event group collapses, and the timeline (including the one or more event groups), is once again displayed.

Figure 1:
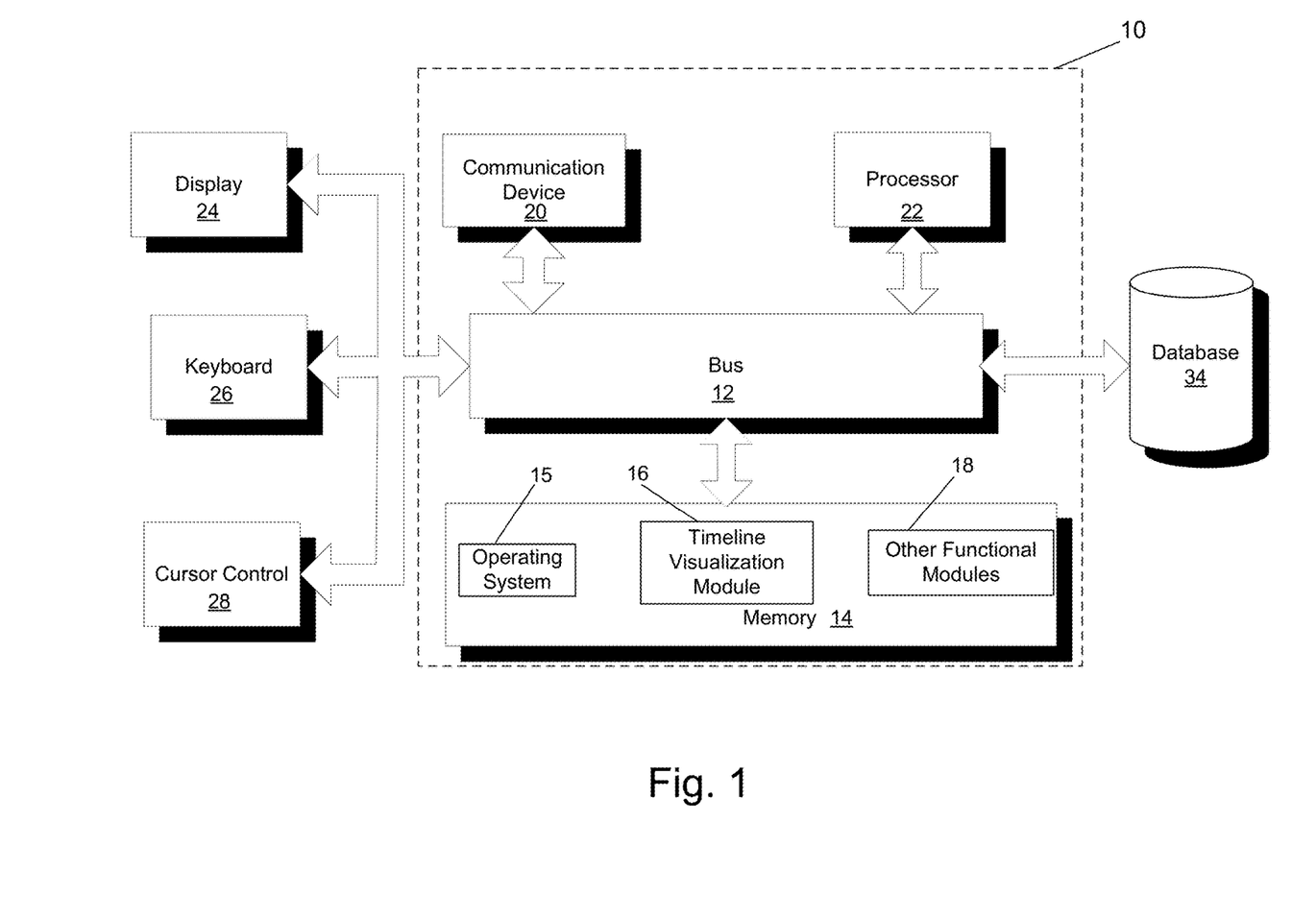
FIG. 1 illustrates a block diagram of a timeline visualization system that can implement an embodiment of the invention.

FIG. 1 illustrates a block diagram of a timeline visualization system 10 that can implement one embodiment of the invention. Timeline visualization system 10 includes a bus 12 or other communications mechanism for communicating information between components of timeline visualization system 10. Timeline visualization system 10 also includes a processor 22, operatively coupled to bus 12, for processing information and executing instructions or operations. Processor 22 may be any type of general or specific purpose processor. Timeline visualization system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Timeline visualization system 10 further includes a communication device 20, such as a network interface card or other communications interface, to provide access to a network. As a result, a user may interface with timeline visualization system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with timeline visualization system 10.

According to one embodiment, memory 14 can store software modules that may provide functionality when executed by processor 22. The modules can include an operating system 15, a timeline visualization module 16, as well as other functional modules 18. Operating system 15 can provide an operating system functionality for timeline visualization system 10. Timeline visualization module 16 can provide functionality for displaying a timeline, as will be described in more detail below. In certain embodiments, timeline visualization module 16 can comprise a plurality of modules that each provide specific individual functionality for displaying a timeline. Timeline visualization system 10 can also be part of a larger system, such as an enterprise resource planning ("ERP") system. Thus, timeline visualization system 10 can include one or more additional functional modules 18 to include the additional functionality. For example, functional modules 18 may include modules that provide additional functionality, such as a "Fusion" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
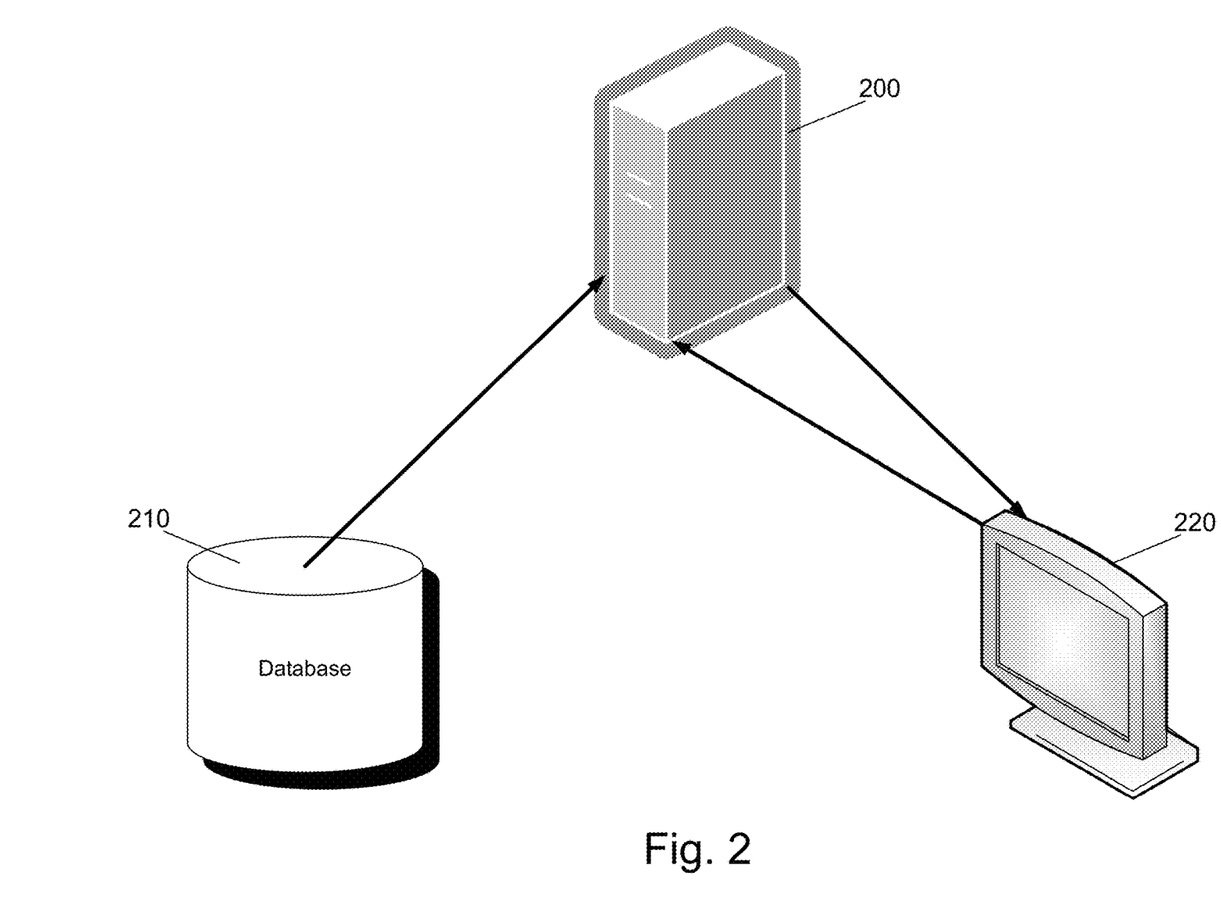
FIG. 2 illustrates a block diagram of a timeline visualization system that interfaces with a database and a display, according to an embodiment of the invention.

FIG. 2 illustrates a block diagram of a timeline visualization system 200 that interfaces with a database 210 and a display 220, according to an embodiment of the invention. In one embodiment, timeline visualization system 200 is identical to timeline visualization system 10 of FIG. 1. As illustrated in FIG. 2, timeline visualization system 200 is operatively coupled to database 210 and display 220. Database 210 can store data in an integrated collection of logically-related records or files. In one embodiment, database 210 stores data associated with one or more events that occur within a specific period of time. Data associated with each event can be stored in a separate record or file within database 210. In one example embodiment, the data is human resources data, and an event is an employment history event that occurs within a specific period of time (such as a marital status change for an employee, or an update of a W2 form for an employee). Database 210 can be an operational database, an analytical database, a data warehouse, a distributed database, an end-user database, an external database, a navigational database, an in-memory database, a document-oriented database, a real-time database, a relational database, an object-oriented database, or any other database known in the art. In alternate embodiments, timeline visualization system 200 can be operatively coupled to any other type of data store configured to store data, such as a file system. Display 220 can display information to a user. A keyboard and a cursor control device, such as a computer mouse, can also be operatively coupled to display 220 to enable the user to interact with timeline visualization system 200 (keyboard and cursor control device not shown in FIG. 2).

According to the embodiment, timeline visualization system 200 can select and retrieve data from database 210. As is described below in greater detail, timeline visualization system 200 can organize the retrieved data into one or more events, where each of the one or more events occurs at a specific time. As is also described below in greater detail, timeline visualization system 200 can identify two or more events of the one or more events that are related. Timeline visualization system 200 can define a criteria that is utilized to determine whether two or more events are related. In one embodiment, the criteria is defined so that two or more events are related when they occur on a same date and/or time, or approximately on a same date and/or time. By "approximately," it is understood that the two or more events may be separated by a duration that is within a predefined tolerance (such as one second, thirty seconds, one minute, thirty minutes, one hour, twenty four hours, seven days, etc.). In another embodiment, the criteria is further defined so that the two or more events are related when, in addition to occurring on a same date and/or time (or approximately on a same date and/or time), they are events that are part of a common overall transaction. For example, in an embodiment where the data retrieved from database 210 is human resources data, where a first event is associated with a marital status change of an employee, a second event is associated with an update of a W2 form for the same employee, and the first and second events occur at the same date and/or time (or approximately at the same date and/or time), the events are identified as related events, because the events are part of an overall common transaction of updating an employee's record. Timeline visualization system 200 can then group the two or more related events into an "event group," where an event group is defined as a group of two or more related events. If an event is not identified as being related to any other event, then the event is not grouped into an event group. Thus, in accordance with the embodiment, timeline visualization system 200 can group the one or more events into one or more event groups based on the criteria.

Timeline visualization system 200 then displays a timeline within display 220, where the timeline includes the data retrieved from database 210. According to the embodiment, the data is organized into one or more events, where related events are grouped into one or more event groups. Thus, the one or more events, and the one or more event groups, are also displayed within the timeline. Timeline visualization system 200 can then receive input from display 220, where the input can include a user interaction with display 220, such as a user moving a cursor control device so that an icon representing the cursor control device is positioned within the timeline displayed within display 220, and clicking the cursor control device. As is described below in greater detail, timeline visualization system 200 can then display a modified view of the timeline, including the one or more events and the one or more event groups, within display 220, where the modified view is based on the user interaction.

Figure 3:
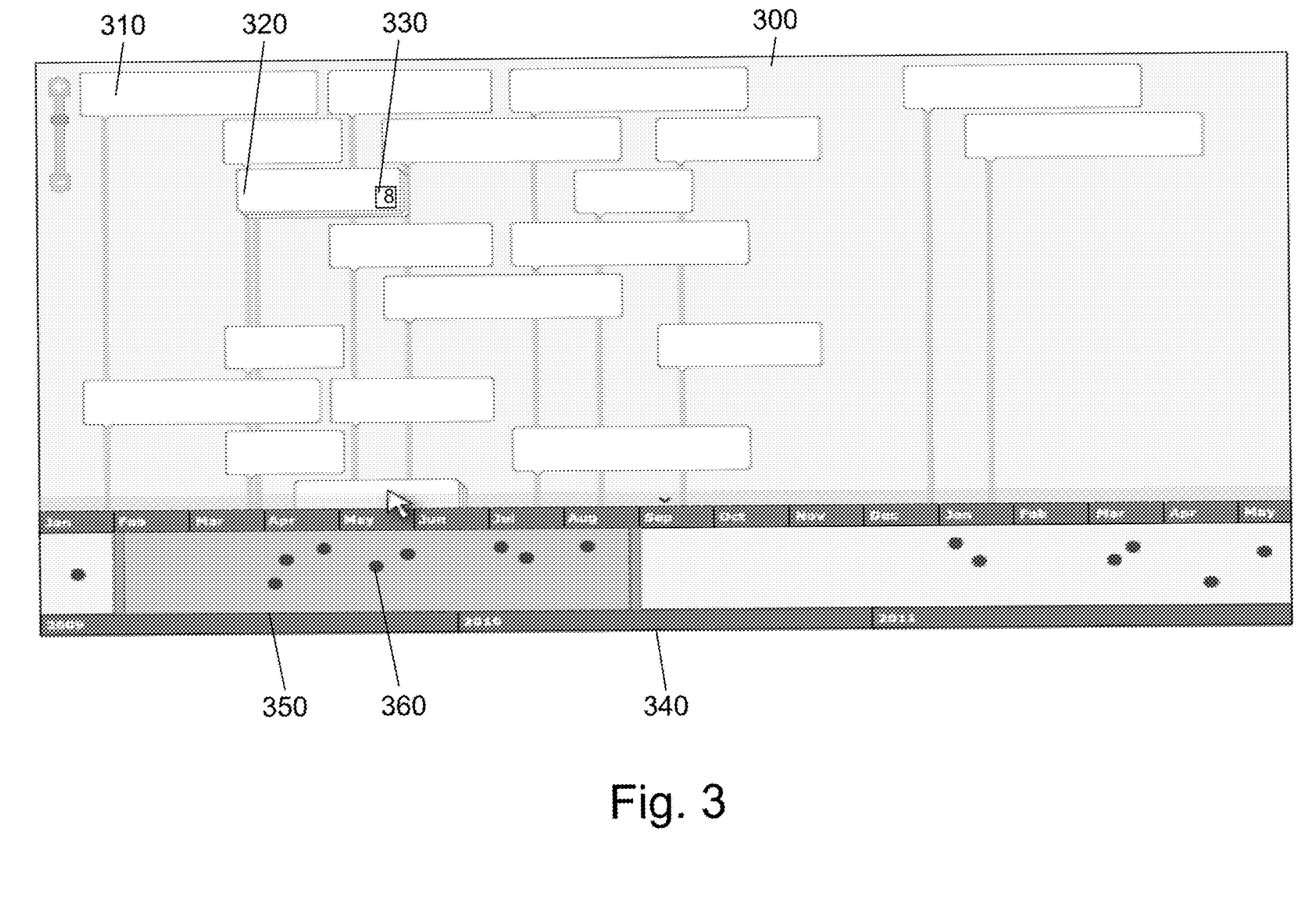
FIG. 3 illustrates a user interface of a timeline visualization system that includes events displayed within a timeline, according to an embodiment of the invention.

FIG. 3 illustrates a user interface of a timeline visualization system that includes events displayed within a timeline 300, according to an embodiment of the invention. As illustrated in FIG. 3, the timeline visualization system displays the user interface at a display. The timeline visualization system displays timeline 300 within the user interface, and the timeline visualization system also displays one or more events, such as event 310, within timeline 300. In the embodiment, each event (including event 310) is displayed as a single bubble-shaped icon. Each event (including event 310) is positioned within timeline 300 based on a date and/or time associated with each of the events. Thus, the events are displayed within timeline 300 in a chronological order. The timeline visualization system can display any number of events within timeline 300, and can display each event using any icon.

As also illustrated in FIG. 3, the timeline visualization system also displays one or more event groups, such as event group 320, within timeline 300. As previously described, an event group, such as event group 320, is a group of one or more related events. In the embodiment, each event group (including event group 320) is displayed as a stack of bubble-shaped icons. In one embodiment, the timeline visualization system can animate the stack of icons displayed to a user to indicate to the user that there is more than one related event associated with the event group. The animation of the stack of icons can occur in response to a user interaction, such as the user moving a cursor control device so that an icon representing the cursor control device is positioned over the stack of icons. Each event group (including event group 320) is positioned within timeline 300 based on a date and/or time associated with each of the related events that comprise the event group. Thus, the event groups are also displayed within timeline 300 in a chronological order. The timeline visualization system can display any number of event groups within timeline 300, and can display each event group using any stack of icons.

As also illustrated in FIG. 3, the timeline visualization system can display an event group within the user interface, such as event group 320, so that the event group includes a counter, such as counter 330. A counter indicates a number of related events that the event group comprises. In the illustrated embodiment of FIG. 3, counter 330 indicates that event group 320 comprises eight related events. Furthermore, in the illustrated embodiment of FIG. 3, counter 330 is displayed as a rectangle within event group 320, where the rectangle includes a number ("8") representing the number of related events that event group 320 comprises. However, the timeline visualization system can display counter 330 using any format that indicates a number of related events that comprise event group 320. Furthermore, the timeline visualization system can display an event group within the user interface, such as event group 320, so that the event group includes aggregated information about the event group. The aggregated information can be any type of aggregated information, such as a number of related events that comprise the event group.

As also illustrated in FIG. 3, the timeline visualization system can display an overview panel 340. Overview panel 340 displays an overview of timeline 300, including a portion of timeline 300 that is not viewable within the display. The timeline visualization system can also display overview window 350 that corresponds to a viewable portion of timeline 300. In one embodiment, overview window 350 can be displayed in a different color from overview panel 340. According to the embodiment, a user can drag overview window 350 in a horizontal direction, through the use of a cursor control device, to navigate timeline 300. Furthermore, according to the embodiment, overview window 350 can change size depending on a zoom level of timeline 300. In addition, overview window 350 can be resized by the user. Resizing overview window can also change the zoom level of timeline 300. Resizing overview window 350 to be larger increases the zoom level of timeline 300, and resizing overview window 350 to be small decreases the zoom level of timeline 300.

As also illustrated in FIG. 3, the timeline visualization system can display one or more markers (such as marker 360) within overview panel 340. Each marker represents an event. In response to moving a cursor control device so that an icon representing the cursor control device is positioned over an event, the timeline visualization system can highlight a marker that corresponds to the event. Likewise, in response to moving a cursor control device so that an icon representing the cursor control device is positioned over a marker, the timeline visualization system can highlight an event that corresponds to the marker. Furthermore, if a marker corresponds to an event that is within a viewable portion of timeline 300, the marker is displayed within overview window 350. In one embodiment, by moving a cursor control device so that an icon representing the cursor control device is positioned over a marker, and clicking on the cursor control device, the timeline visualization system updates its display of timeline 300 so that the marker appears in the center of overview window 350.

Figure 4:
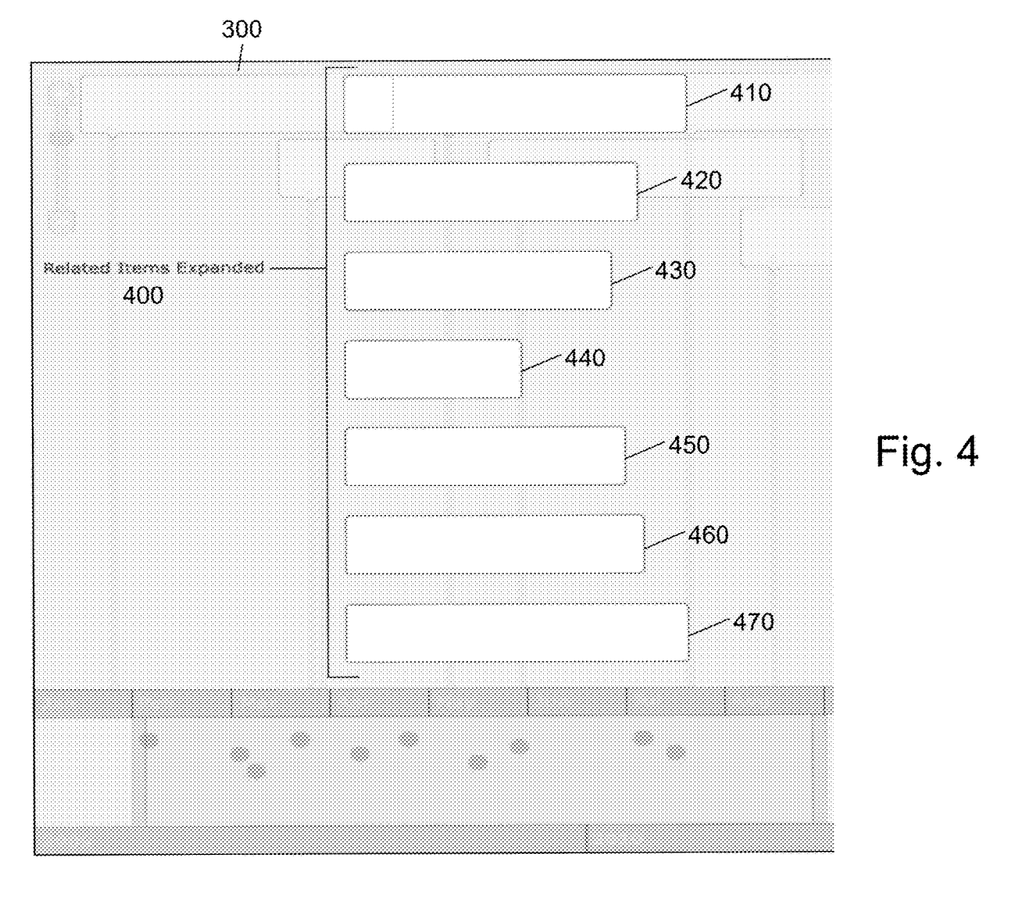
FIG. 4 illustrates a user interface of a timeline visualization system that includes a displayed expanded view of an event group, according to an embodiment of the invention.

FIG. 4 illustrates a user interface of a timeline visualization system that includes a displayed expanded view of an event group, according to an embodiment of the invention. An expanded view of an event group is a view of the event group that displays all of the related events that comprise the event group. Thus, in an embodiment where an event is displayed as a bubble-shaped icon, expanded view of an event group displays a plurality of bubble-shaped icons, where each bubble-shaped icon represents a related event of the event group. In one embodiment, the timeline visualization system can display the expanded view of the event group in a layer that is displayed over timeline 300. Also in one embodiment, the timeline visualization system can display the expanded view of the event group in response to a user interaction, such as a user moving a cursor control device so that an icon representing the cursor control device is positioned over the event group, and clicking on the cursor control device.

In the illustrated embodiment of FIG. 4, in response to a user clicking on a display of an event group, through the use of a cursor control device, the timeline visualization system displays expanded view 400. Expanded view 400 is an expanded view of the event group that is clicked on by the user, and expanded view 400 displays related events 410, 420, 430, 440, 450, 460, and 470. In the embodiment, each event of related events 410, 420, 430, 440, 450, 460, and 470 is displayed as a single bubble-shaped icon. As illustrated in FIG. 4, expanded view 400 is displayed in a layer that is displayed over timeline 300. In the illustrated embodiment of FIG. 4, related events 410, 420, 430, 440, 450, 460, and 470 are displayed as a list of events. However, in alternate embodiments, related events 410, 420, 430, 440, 450, 460, and 470 can be displayed according to different formats. For example, in an alternate embodiment, related events 410, 420, 430, 440, 450, 460, and 470 can be displayed as a grid of events.

Figure 5:
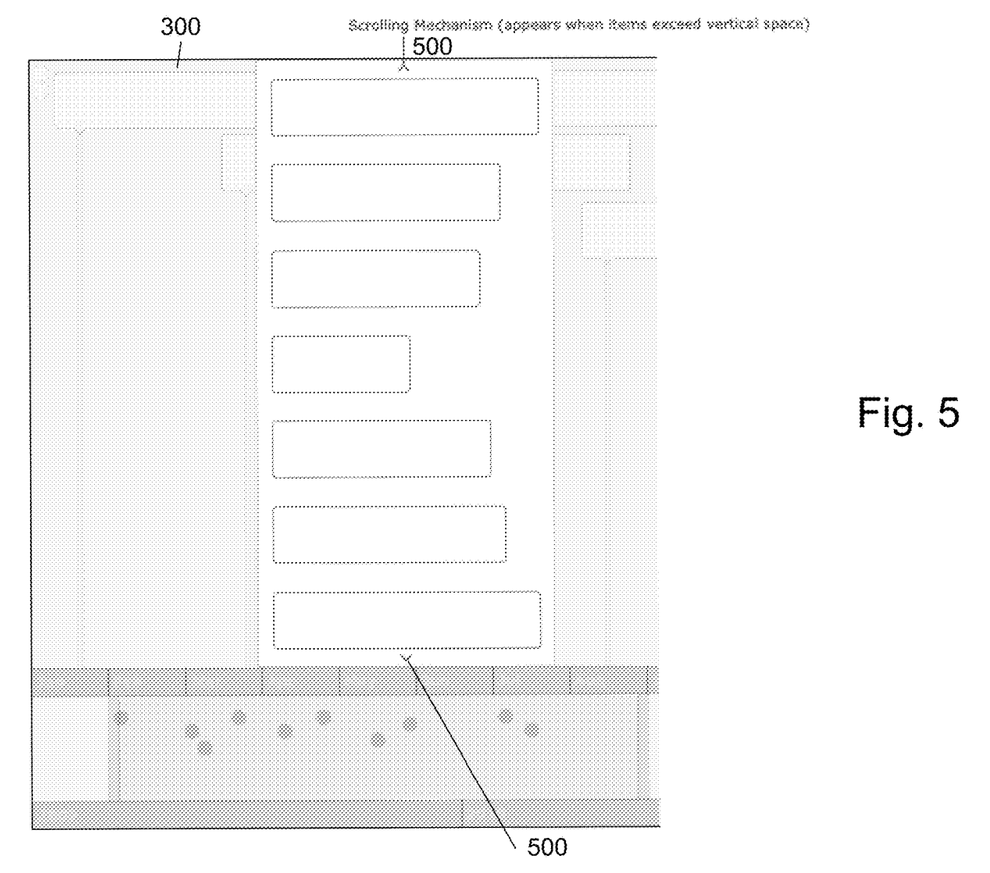
FIG. 5 illustrates a user interface of a timeline visualization system that includes a scrolling mechanism displayed within an expanded view of an event group, according to an embodiment of the invention.

FIG. 5 illustrates a user interface of a timeline visualization system that includes a scrolling mechanism displayed within an expanded view of an event group, according to an embodiment of the invention. In situations where an event group includes a number of related events that is greater than the number of related events that can be displayed within the user interface, a scrolling mechanism, such as scrolling mechanism 500, is also displayed within an expanded view of the event group. In the illustrated embodiment of FIG. 5, scrolling mechanism 500 is displayed as two arrow icons, where one arrow icon is displayed at the top of the user interface, and one arrow icon is displayed at the bottom of the user interface. Scrolling mechanism 500 is also displayed in a layer that is displayed over timeline 300. According to the embodiment, by moving a cursor control device so that an icon representing the cursor control device is positioned over scrolling mechanism 500 and clicking the cursor control device, the user can scroll through the list of related events and navigate to the related events that are not initially displayed within the user interface. Thus, scrolling mechanism 500 scrolls through the related events of the event group.

According to an embodiment, the timeline visualization system can collapse an event group that has been expanded by removing a display of an expanded view of the event group from the user interface. Thus, after removing the display of the expanded view, only the original timeline is displayed. In one embodiment, the timeline visualization system can remove the display of the expanded view in response to a user interaction, such as a user moving a cursor control device so that an icon representing the cursor control device is positioned outside the expanded view of the event group, and clicking on the cursor control device.

Figure 6:
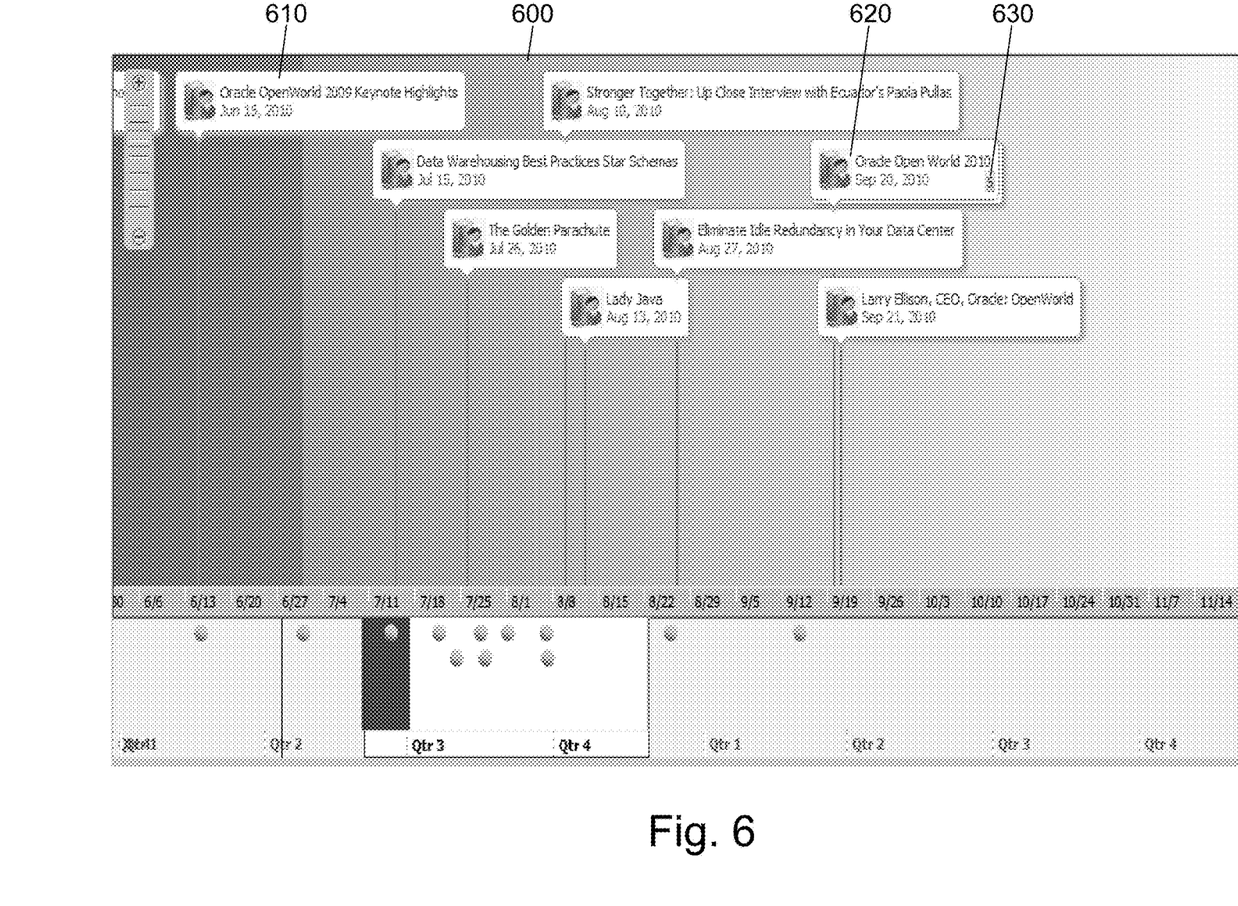
FIG. 6 illustrates an example timeline displayed within a user interface of a timeline visualization system, according to an embodiment of the invention.

FIG. 6 illustrates an example timeline 600 displayed within a user interface of a timeline visualization system, according to an embodiment of the invention. As illustrated in FIG. 6, timeline 600 includes events, such as event 610, within timeline 600. Each event, including event 610, is displayed as a bubble-shaped icon within timeline 600. Each event, including event 610, is positioned within timeline 600 based on a date and/or time associated with the event. As also illustrated in FIG. 6, timeline 600 includes event group 620, where event group 620 is also displayed within timeline 600. In the embodiment, event group 620 is displayed as a stack of bubble-shaped icons. Also according to the embodiment, event group 620 is positioned within timeline 600 based on a date and/or time associated with each of the related events that comprise event group 620. Event group 620 also includes counter 630, where counter 630 indicates how many related events comprise event group 620.

Figure 7:
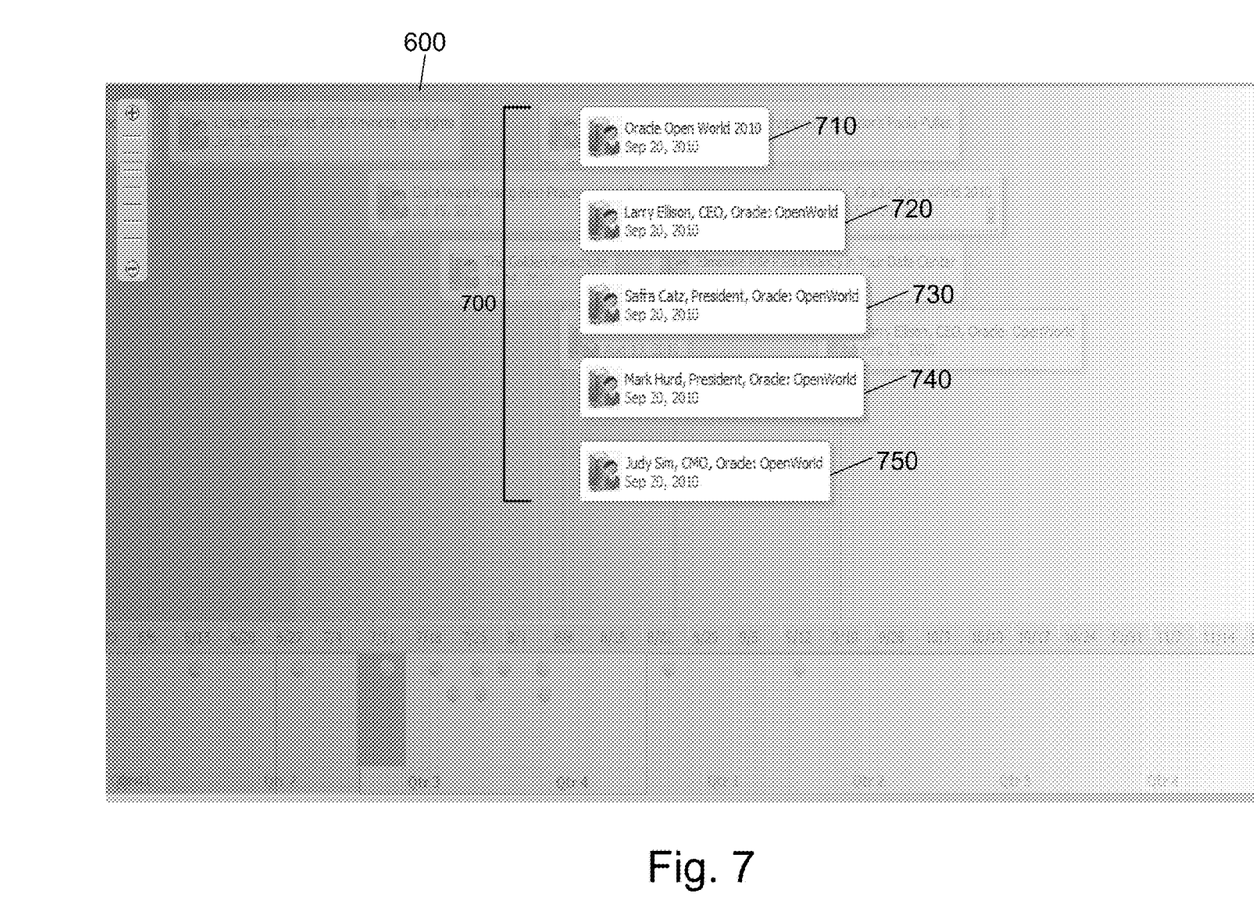
FIG. 7 illustrates an example expanded view of an event group displayed within a user interface of a timeline visualization system, according to an embodiment of the invention.

FIG. 7 illustrates an example expanded view of an event group displayed within a user interface of a timeline visualization system, according to an embodiment of the invention. In the illustrated embodiment of FIG. 7, in response to a user clicking on a event group 620 of FIG. 6 through the use of a cursor control device, the timeline visualization system displays expanded view 700. Expanded view 700 is an expanded view of event group 620, and expanded view 700 displays related events 710, 720, 730, 740, 750, 760, and 770. In the embodiment, each event of related events 710, 720, 730, 740, 750, 760, and 770 is displayed as a single bubble-shaped icon. As illustrated in FIG. 7, expanded view 700 is displayed in a layer that is displayed over timeline 600. According to an embodiment, in response to a user interaction, such as a user moving a cursor control device so that an icon representing the cursor control device is positioned outside the expanded view of the event group, and clicking on the cursor control device, the timeline visualization system can collapse event group 620 of FIG. 6 (where event group 620 is expanded through expanded view 700 of FIG. 7) by removing a display of expanded view 700 from the user interface. Thus, after removing the display of expanded view 700, only timeline 600 is displayed.

Figure 8:
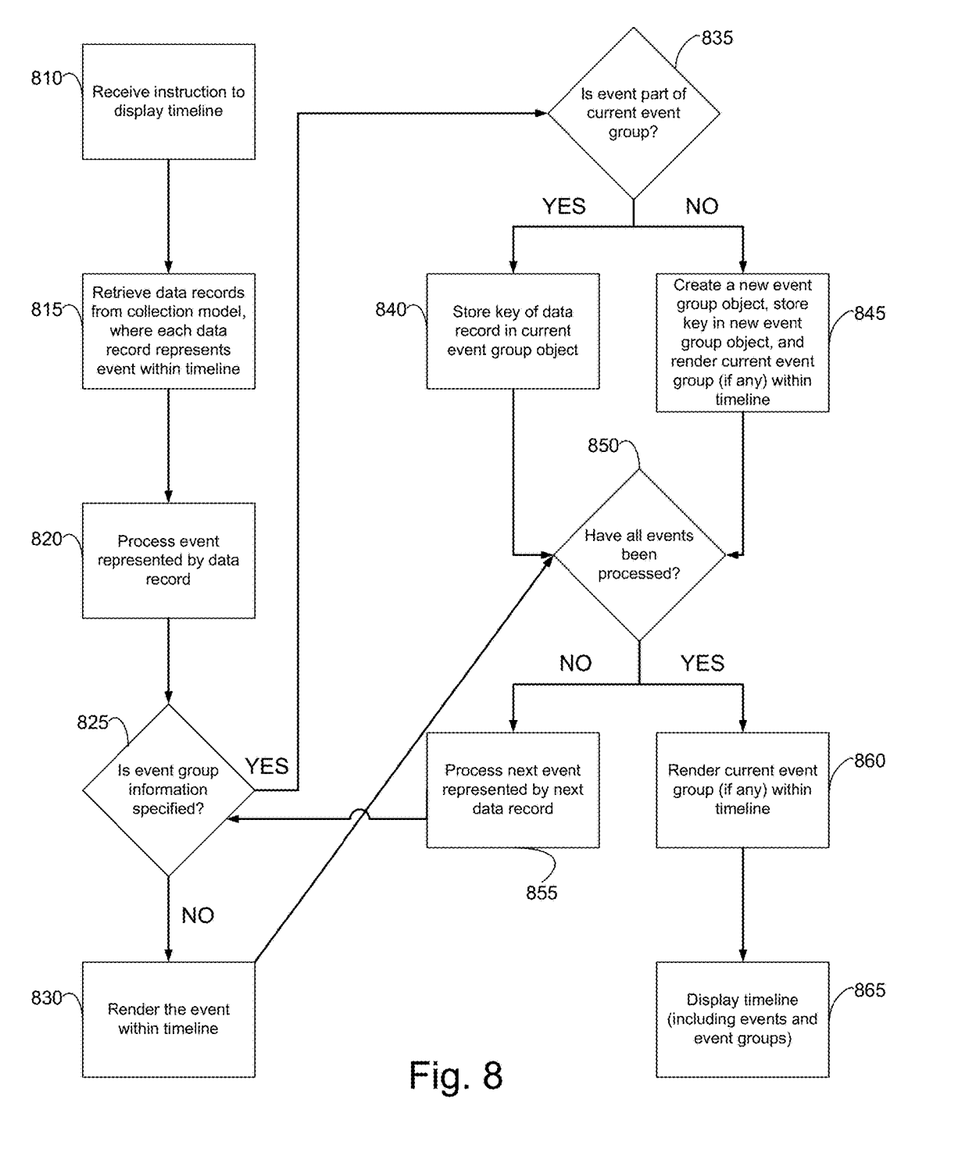
FIG. 8 illustrates a flow diagram for displaying events and event groups within a timeline, according to an embodiment of the invention.
Figure 9:
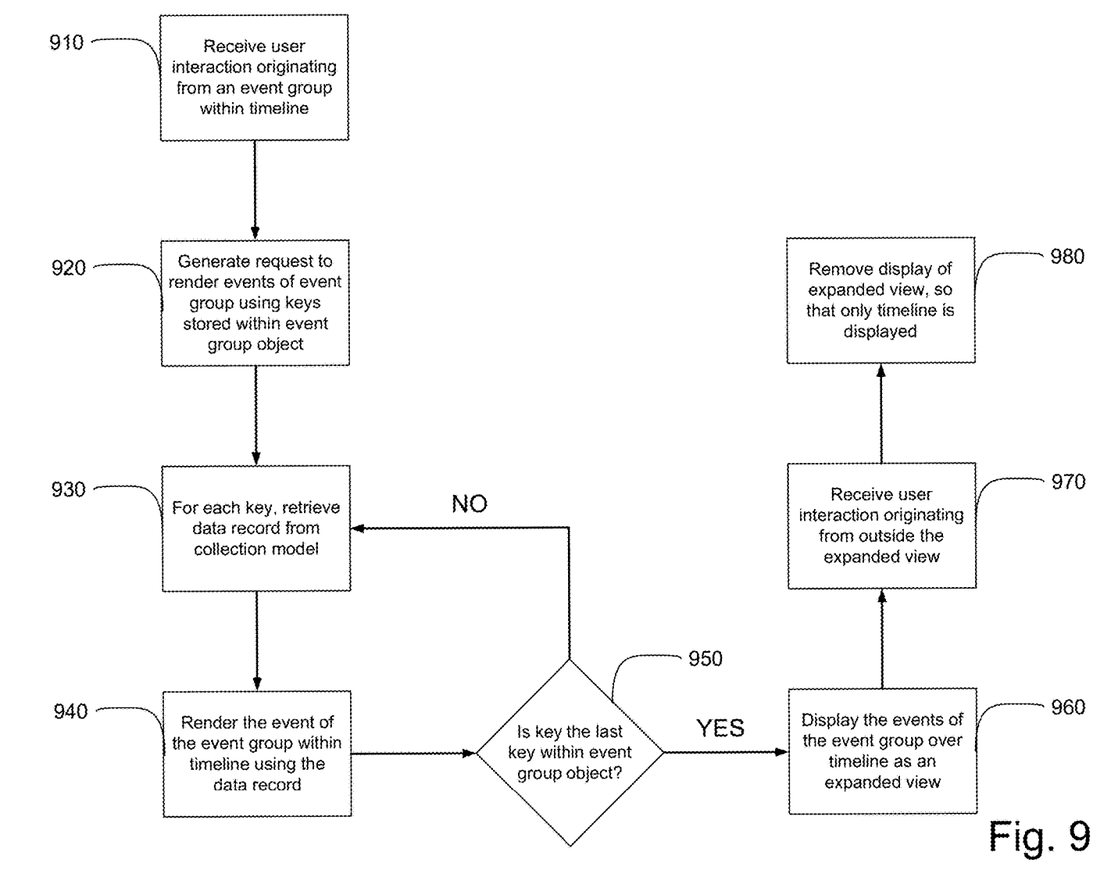
FIG. 9 illustrates a flow diagram for displaying an expanded view of an event group within a timeline, according to an embodiment of the invention.
Figure 10:
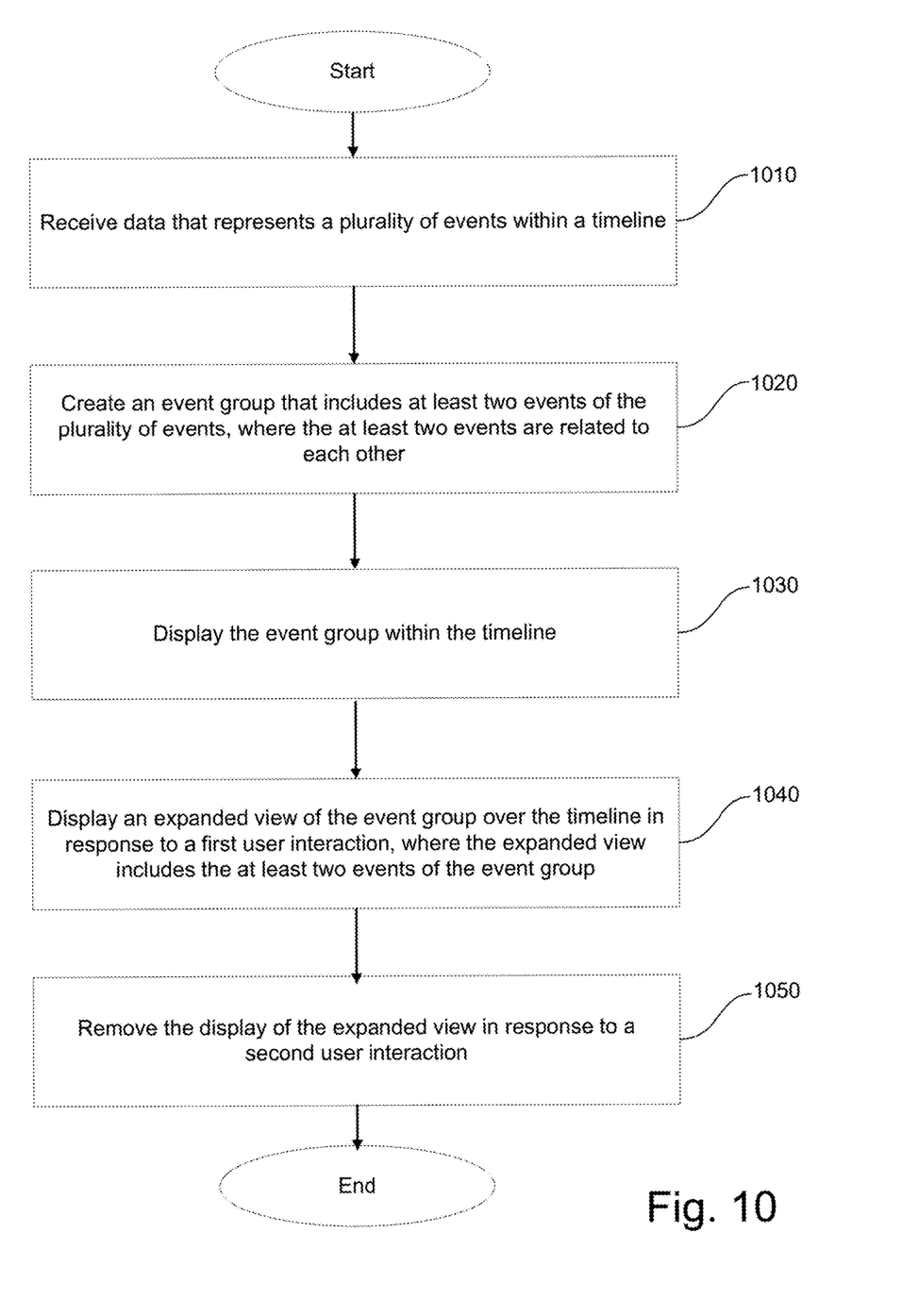
FIG. 10 illustrates a flow diagram of the functionality of a timeline visualization module, according to an embodiment of the invention.

FIG. 8 illustrates a flow diagram for displaying events and event groups within a timeline, according to an embodiment of the invention. In one embodiment, the functionality of the flow diagram of FIG. 8, and the functionality of the flow diagrams of FIGS. 9 and 10, are implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In one embodiment, the functionality of the flow diagram of FIG. 8 is performed by a timeline visualization module (such as timeline visualization module 16 of FIG. 1).

At 810, an instruction to display a timeline is received. This instruction can be received in response to an interaction initiated by a user. For example, an instruction to display a timeline can be received in response to a user utilizing a web browser to navigate to a web page that includes an instruction to display a timeline. The flow then proceeds to 815.

At 815, one or more data records are retrieved from a collection model, where each data record represents an event in a timeline. As previously described, a timeline visualization system can be operatively coupled to a data store, such as a database, that can store data in an integrated collection of logically-related records (identified in this context as "data records"). According to the embodiment, a collection model is an object that can retrieve one or more data records from the data store and store the data records within the object. An object, as understood by one of ordinary skill in the relevant art, is a compilation of attributes, such as values, variables and data structures, and methods, such as functions, subroutines, and behaviors, that encapsulate an entity, where the object can be stored in a memory. Thus, in accordance with the embodiment, one or more data records can be retrieved from the collection model, rather than from the data store directly. This can be done to increase overall performance speed of a timeline visualization system. Each data record can include a key that uniquely identifies the data record and can include event information. For example, event information can include one or more fields within the data record, where each field includes a value that identifies information about the event. Some non-limiting examples of fields include event name, event type, event date, and event time. Furthermore, event information can include event group information, where event group information can include a field that identifies whether the event is part of an event group. The flow then proceeds to 820.

At 820, an event represented by the data record is processed. More specifically, the first data record of the one or more data records retrieved from the collection model is selected and processed. By processing the data record, the event represented by the data record is also processed. Processing the event represented by the data record includes retrieving event information stored within the data record and using the event information to create an icon that is displayed within a timeline. As previously described, a timeline visualization system can be operatively coupled to a display, such as an LCD, that can display a timeline based on data transmitted to the display by the timeline visualization system. As the flow diagram illustrated in FIG. 8 is executed, each of the one or more data records are selected and processed, and thus, each of the events represented by the one or more data records are processed. The flow then proceeds to 825.

At 825, it is determined whether event group information is specified within the data record. As previously described, two or more events can be related events, and thus, can be part of an event group. If an event is part of an event group, the corresponding data record includes event group information identifying that the event is part of an event group. For example, event group information can include a field within the data record that includes a value that identifies an event group that the event is part of. If the event is not part of an event group, the corresponding data record does not include event group information. In the illustrated embodiment of FIG. 8, if event group information is not specified in the corresponding data record, the flow proceeds to 830. If event group information is specified in the corresponding data record, the flow proceeds to 835.

At 830, the event represented by the data record is rendered within the timeline. More specifically, the event information stored within the data record is retrieved and used to create an icon that is displayed within the timeline. For example a value for an event name field is retrieved and included within the icon. As another example, a value for an event type field is retrieved and utilized to determine a shape of the icon. As yet another example, a value for an event date and/or time field is retrieved and used to determine a position of the icon within the timeline. The icon is rendered as an event icon, as it is an individual event that is rendered, rather than an event group. The flow then proceeds to 850.

At 835, it is determined whether the event represented by the data record is part of a current event group. As previously described, as the flow diagram illustrated in FIG. 8 is executed, each of the one or more data records are selected and processed, and thus, each of the events represented by the one or more data records are processed. Thus, when it is determined that the event represented by the data record is part of an event group, it is also determined whether the event is part of an event group that is currently being rendered, or whether the event is part of a new event group that will be rendered. If the event is part of an event group that is currently being rendered, the flow proceeds to 840. If the event is not part of an event group that is currently being rendered, the flow proceeds to 845.

At 840, a key of the data record that represents the event is stored in a current event group object. An event group object is an object that represents an event group, and a current event group object is an object that represents an event group that is currently being rendered. As previously described, an event group includes one or more related events. Thus, an event group object includes one or more keys, where each key is a key of a data record that represents a corresponding event. By storing the key of the data record in the current event group object, the event represents by the data record is associated with the current event group represented by the current event group object. Thus, if it is determined that the event is part of the event group that is currently being rendered, the key of the data record is stored in the current event group object. The flow then proceeds to 850.

At 845, a new event group object is created, a key of the data record that represents the event is stored in the new event group object, and the current event group (if any) is rendered within the timeline. If it is determined that the event is not part of the event group that is currently being rendered, then the event is part of a new event group. Thus, a new object that represents the new event group (i.e., a new event group object) is created, and the key of the data record that represents the event is stored in the new event group object, as the first key of the new event group object.

Furthermore, the event may not be a part of the event group that is currently being rendered. This may be because there is no event group currently being rendered (i.e., the event is the first event associated with an event group), or because the event is part of a new event group, which signifies that there are no more events for the current event group. Thus, if there is an event group currently being rendered, the current event group is rendered within the timeline. More specifically, each of the keys of the current event group object are retrieved, and for each key, the event information stored within the corresponding data record is retrieved. Thus, the event information for each data record that represents each event is used to create an icon that is displayed within the timeline. For example, a data record that represents one of the events is selected, and a value for an event name field is retrieved and included within the icon. As another example, a data record that represents one of the events is selected, and a value for an event date and/or time field is retrieved and used to determine a position of the icon within the timeline. In one embodiment, a number of keys is determined and included within the icon as a counter. The icon is rendered as an event group icon, as it is an event group that is rendered, rather than an individual event. The flow then proceeds to 850.

At 850, it is determined whether all events have been processed. As previously described, each of the one or more data records of the collection model are selected and processed, and thus, each of the events represented by the one or more data records are processed. This it is determined whether all of the data records of the collection model have been processed, or whether there are one or more remaining data records to be processed. If all of the data records have not been processed (i.e., all events have not been processed), the flow proceeds to 855. If all of the data records have been processed (i.e., all events have been processed), the flow proceeds to 860.

At 855, the next event represented by the next data record is processed. More specifically, the next data record of the one or more data records retrieved from the collection model is selected and processed. As previously described, by processing the next data record, the next event represented by the next data record is also processed. The flow then proceeds to 825.

At 860, the current event group (if any) is rendered within the timeline. While all events have been processed, there still may be an event group that is currently being rendered. Thus, if there is an event group currently being rendered, the current event group is rendered within the timeline. More specifically, as previously described, each of the keys of the current event group object are retrieved, and for each key, the event information stored within the corresponding data record is retrieved. Thus, the event information for each data record that represents each event is used to create an icon that is displayed within the timeline. The icon is rendered as an event group icon, as it is an event group that is rendered, rather than an individual event. The flow then proceeds to 865.

At 865, the timeline is displayed, where the rendered events and event groups are also displayed. More specifically, the timeline is displayed within the display, and the rendered events and rendered event groups are displayed within the timeline. In one embodiment, each rendered event is displayed as a single bubble-shaped icon, and each rendered event is positioned within the timeline based on a date and/or time associated with the rendered event, so that the rendered events are displayed in a chronological order. According to the embodiment, each event group is displayed as a stack of bubble-shaped icons, and each event group is positioned within the timeline based on a date and/or time associated with the event group, so that the rendered event groups are also displayed within the timeline in a chronological order. Each rendered event, and each rendered event group, can be displayed within the timeline using any type of icon.

FIG. 9 illustrates a flow diagram for displaying an expanded view of an event group within a timeline, according to an embodiment of the invention. In one embodiment, the functionality of the flow diagram of FIG. 9 is performed by a timeline visualization module (such as timeline visualization module 16 of FIG. 1).

At 910, a user interaction originating from an event group displayed within the timeline is received. In one embodiment, the user interaction is a user clicking on the display of the event group, through the use of a cursor control device. The flow then proceeds to 920.

At 920, a request to render one or more events of the event group is generated using one or more keys stored within an event group object. Displaying an expanded view of an event group involves displaying each of the one or more events that comprise the event group. Thus, displaying an expanded view of the event group involves rendering the one or more events of the event group. Generating the request to render the one or more events includes selecting an event group object that corresponds to the event group. As previously described, an event group object is an object that represents an event group, and includes one or more keys, where each key is a key of a data record that represents a corresponding event. The flow then proceeds to 930.

At 930, for each key of the event group object, a data record is retrieved from a collection model. In other words, the first time the flow is executed at 930, a first data record is retrieved from the collection model. Thereafter, each time the flow is executed at 930, the next data record is retrieved from the collection model. As previously described, a collection model is an object that can store one or more data records retrieved from a data store. The data record retrieved from the collection model represents an event of the event group. The flow then proceeds to 940.

At 940, the event of the event group is rendered within the timeline using the data record. More specifically, the event information stored within the data record is retrieved and used to create an icon that is displayed in a layer over the timeline. The icon is rendered as an event icon, as it is an individual event that is rendered, rather than an event group. The flow then proceeds to 950.

At 950, it is determined whether the key is the last key stored within the event group object. If the key is the last key stored within the event group object, then all the events of the event group have been rendered. Otherwise, then there are remaining events to be rendered. If the key is not the last key stored within the event group object, the flow proceeds to 930. If the key is the last key stored within the event group object, the flow proceeds to 960.

At 960, the events of the event group are displayed over the timeline as an expanded view. The expanded view can be displayed in a layer that is displayed over the timeline. In one embodiment, each of the events is displayed as a single bubble-shaped icon. Also in one embodiment, the events are displayed as a list of events. However, in alternate embodiments, the events can be displayed according to different formats. For example, in an alternate embodiment, the events can be displayed as a grid of events.

In one embodiment, where a number of events is greater than the number of events that can be displayed, a scrolling mechanism, is also displayed within the expanded view. The scrolling mechanism can be displayed as two arrow icons, where one arrow icon is displayed at the top of the expanded view, and one arrow icon is displayed at the bottom of the expanded view. According to the embodiment, by moving a cursor control device so that an icon representing the cursor control device is positioned over one of the two arrow icons and clicking the cursor control device, the user can scroll through the list of events and navigate to the events that are not initially displayed within the expanded view. The flow then proceeds to 970.

At 970, a user interaction originating from outside the expanded view of the event group displayed within the timeline is received. In one embodiment, the user interaction is a user clicking outside the expanded view of the event group, through the use of a cursor control device. The flow then proceeds to 980.

At 980, the display of the expanded view is removed, so that only the timeline is displayed. Thus, in response to the user interaction, the event group is collapsed, and the original timeline is displayed.

FIG. 10 illustrates a flow diagram of the functionality of a timeline visualization module (such as timeline visualization module 16), according to an embodiment of the invention.

At 1010, data that represents a plurality of events within a timeline is received. The data can be received from a collection model, wherein a collection model is an object that retrieves one or more data records from a data store and stores the data records within the object.

At 1020, an event group is created that includes at least two events of the plurality of events, where the at least two events are related events based on a criteria. In an embodiment where the data takes the form of one or more data records, each data record of the one or more data records represents an event and comprises a key and event information; and each of the at least two events of the event group can be stored within an event group object; where the event group object represents the event group and comprises one or more keys. In one embodiment, the criteria is defined so that two or more events are related when they occur on a same date and/or time (or approximately on a same date and/or time). In an another embodiment, the criteria is further defined so that the two or more events are related when they are also events that are part of a common overall transaction.

At 1030, the event group is displayed within the timeline. The event group can include a counter, wherein the counter indicates a number of related events that the event group comprises.

At 1040, an expanded view of the event group is displayed over the timeline in response to a first user interaction, where the expanded view includes the at least two events of the event group. A scrolling mechanism can be displayed within the expanded view of the event group, where the scrolling mechanism scrolls through the at least two events of the event group.

At 1050, the display of the expanded view is removed in response to a second user interaction. The display of the event group can be animated in response to a third user interaction.

According to an embodiment, by introducing a concept of an event group within a timeline, a timeline visualization system can visualize groups of related events within the timeline. The timeline visualization system can help a user visually identify a group of related events. The timeline visualization system can also de-clutter a display that is viewed by the user, as there are fewer events displayed within a timeline.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to visualize events within a timeline, the visualizing comprising:
   receiving data that represents a plurality of events;
   creating an event group that comprises at least two events of the plurality of events, wherein the at least two events are related events based on a criteria;
   creating an event group software object that represents the event group, the event group software object storing at least two keys, each of the at least two keys identifying one of the at least two events;
   displaying a graphical user interface to a user, the graphical user interface including:
      an overview panel displaying an overview of the timeline,
      an overview window, slidingly disposed over the overview panel, highlighting a viewable portion of the timeline, the overview window including a marker for the event group, and
      a timeline panel, disposed adjacent to the overview panel, displaying the viewable portion of the timeline;
   displaying the event group within the timeline panel;
   in response to a first user action, using the at least two keys stored within the event group software object to identify the at least two events and display the at least two events in an expanded view of the event group wherein the expanded view comprises a layer comprising the at least two events and the layer is disposed on top of the timeline panel; and
   removing the expanded view in response to a second user interaction outside of the layer.

2. The non-transitory computer-readable medium of claim 1, wherein the event group comprises a counter, wherein the counter indicates a number of related events that the event group comprises.

3. The non-transitory computer-readable medium of claim 1, the visualizing further comprising displaying a scrolling mechanism within the expanded view of the event group, wherein the scrolling mechanism scrolls through the at least two events of the event group.

4. The non-transitory computer-readable medium of claim 1, the visualizing further comprising animating a display of the event group in response to a third user interaction.

5. The non-transitory computer-readable medium of claim 1, the receiving of the data further comprising receiving the data from a collection model, wherein the collection model is a software object that retrieves one or more data records from a data store and stores the one or more data records within the software object.

6. The non-transitory computer-readable medium of claim 5, wherein each data record of the one or more data records represents an event and comprises a key and event information, wherein the key uniquely identifies the event.

7. The non-transitory computer-readable medium of claim 1, wherein the criteria is defined so that two or more events are related when they occur approximately on a same date or at the same time.

8. The non-transitory computer-readable medium of claim 7, wherein the timeline visualizes events as part of an enterprise resource planning system, the plurality of events are tracked by the enterprise resource planning system, and the criteria is further defined so that the two or more events are related when they are also events that are part of a common overall transaction being tracked by the enterprise resource planning system.

9. A computer-implemented method for displaying a timeline, comprising:
   receiving data that represents a plurality of events;
   creating an event group that comprises at least two events of the plurality of events, wherein the at least two events are related events based on a criteria;
   creating an event group software object that represents the event group, the event group software object storing at least two keys, each of the at least two keys identifying one of the at least two events;
   displaying a graphical user interface to a user, the graphical user interface including:
      an overview panel displaying an overview of the timeline,
      an overview window, slidingly disposed over the overview panel, the overview window highlighting a viewable portion of the timeline, the overview window including a marker for the event group, and
      a timeline panel, disposed adjacent to the overview panel, displaying the viewable portion of the timeline;
   displaying the event group within the timeline panel;
   in response to a first user action, using the at least two keys stored within the event group software object to identify the at least two events and display the at least two events in an expanded view of the event group, wherein the expanded view comprises a layer comprising the at least two events and the layer is disposed on top of the timeline panel; and
   removing the expanded view in response to a second user interaction outside of the layer.

10. The computer-implemented method of claim 9, wherein the event group comprises a counter, wherein the counter indicates a number of related events that the event group comprises.

11. The computer-implemented method of claim 9, further comprising displaying a scrolling mechanism within the expanded view of the event group, wherein the scrolling mechanism scrolls through the at least two events of the event group.

12. The computer-implemented method of claim 9, further comprising animating a display of the event group in response to a third user interaction.

13. The computer-implemented method of claim 9, the receiving of the data further comprising receiving the data from a collection model, wherein the collection model is a software object that retrieves one or more data records from a data store and stores the one or more data records within the software object.

14. The computer-implemented method of claim 13, wherein each data record of the one or more data records represents an event and comprises a key and event information, wherein the key uniquely identifies the event.

15. A timeline visualization system, comprising:
  a data receiving module configured to receive data that represents a plurality of events;
  an event group module configured to create an event group that comprises at least two events of the plurality of events, wherein the at least two events are related events based on a criteria;
  the event group module further configured to create an event group software object that represents the event group, the event group software object storing at least two keys, each of the at least two keys identifying one of the at least two events; and
  a display module configured to:
    display a graphical user interface to a user, the graphical user interface including:
      an overview panel, displaying an overview of the timeline,
      an overview window, slidingly disposed over the overview panel, highlighting a viewable portion of the timeline, the overview window including a marker for the event group, and
      a timeline panel disposed adjacent to the overview panel, the timeline panel displaying the viewable portion of the timeline;
    display the event group within the timeline panel; and
    in response to a first user action, use the at least two keys stored within the event group software object to identify the at least two events and display the at least two events in an expanded view of the event group, wherein the expanded view comprises a layer comprising the at least two events and the layer is disposed on top of the timeline panel; and
  wherein the display module is further configured to remove the expanded view in response to a second user interaction outside of the layer.

16. The timeline visualization system of claim 15, wherein the event group comprises a counter, wherein the counter indicates a number of related events that the event group comprises.

17. The timeline visualization system of claim 15, wherein the display module is further configured to display a scrolling mechanism within the expanded view of the event group, wherein the scrolling mechanism scrolls through the at least two events of the event group.

18. The timeline visualization system of claim 15, wherein the display module is further configured to animate a display of the event group in response to a third user interaction.

19. The timeline visualization system of claim 15, wherein the data receiving module is further configured to receive the data from a collection model, wherein the collection model is a software object that retrieves one or more data records from a data store and stores the one or more data records within the software object.

20. The timeline visualization system of claim 19, wherein each data record of the one or more data records represents an event and comprises a key and event information, wherein the key uniquely identifies the event.

* * * * *